(12) United States Patent
Miura et al.

(10) Patent No.: US 10,693,356 B2
(45) Date of Patent: Jun. 23, 2020

(54) VARIABLE-FIELD ROTARY ELECTRIC MACHINE AND VEHICLE PROVIDED WITH SAME

(71) Applicant: HONDA MOTOR CO., LTD., Tokyo (JP)

(72) Inventors: Kazuha Miura, Wako (JP); Yoshihisa Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/266,321

(22) Filed: Feb. 4, 2019

(65) Prior Publication Data
US 2019/0245420 A1    Aug. 8, 2019

(30) Foreign Application Priority Data

Feb. 7, 2018    (JP) ................................. 2018-020408

(51) Int. Cl.
| | |
|---|---|
| H02K 21/12 | (2006.01) |
| H02K 21/02 | (2006.01) |
| H02K 7/00 | (2006.01) |
| H02K 1/27 | (2006.01) |
| H02K 1/24 | (2006.01) |
| H02K 9/19 | (2006.01) |

(52) U.S. Cl.
CPC ............ *H02K 21/023* (2013.01); *H02K 1/246* (2013.01); *H02K 1/2766* (2013.01); *H02K 7/006* (2013.01); *H02K 9/19* (2013.01); *H02K 2213/09* (2013.01)

(58) Field of Classification Search
CPC ...... H02K 33/00; H02K 21/023; H02K 1/246; H02K 1/2766; H02K 7/006; H02K 9/19; H02K 2213/09
See application file for complete search history.

(56) References Cited

U.S. PATENT DOCUMENTS 2,891,213 A * 6/1959 Kern ....................... G05D 13/00
                                                            322/42
5,782,322 A * 7/1998 Hauck ...................... F16D 65/18
                                                            188/162

(Continued)

FOREIGN PATENT DOCUMENTS

| JP | 2008-125235 A | 5/2008 |
| JP | 2010-057209 A | 3/2010 |
| JP | 2010-148257 A | 7/2010 |

OTHER PUBLICATIONS

Japanese Office Action dated May 28, 2019, 3 pages.

*Primary Examiner* — Thanh Lam
(74) *Attorney, Agent, or Firm* — Rankin, Hill & Clark LLP (57) ABSTRACT

The variable-field rotary electric machine includes: a rotor that is rotatably integrated with a shaft while an axis of the shaft is used as a rotation axis and includes a movable iron core and a displacement mechanism configured to displace the movable iron core in an axial direction of the rotation shaft. The displacement mechanism includes: a cylinder unit including a cylinder chamber to retain hydraulic fluid according to a rotor speed, a piston member connected to the movable iron core, and a sealer member provided at the piston member. The the piston member and the movable iron core are displaced in the axial direction of the rotation shaft in response to an increase or decrease in an amount of the hydraulic fluid in the cylinder chamber.

8 Claims, 12 Drawing Sheets

(56) References Cited

U.S. PATENT DOCUMENTS

| | | | |
|---|---|---|---|
| 7,569,970 B2* | 8/2009 | Iwata | H02K 21/029 |
| | | | 310/114 |
| 7,671,500 B2* | 3/2010 | Masuda | F03C 4/00 |
| | | | 310/112 |
| 8,659,192 B2* | 2/2014 | Isogai | H02K 9/193 |
| | | | 310/54 |
| 2011/0100487 A1* | 5/2011 | Chen | F16K 31/40 |
| | | | 137/487.5 |
| 2012/0112580 A1* | 5/2012 | Sato | H02K 3/522 |
| | | | 310/71 |

* cited by examiner

VARIABLE-FIELD ROTARY ELECTRIC MACHINE AND VEHICLE PROVIDED WITH SAME

TECHNICAL FIELD

The present invention relates to a variable-field rotary electric machine and a vehicle provided with the variable-field rotary electric machine.

BACKGROUND ART

Generally speaking, rotary electric machines have an increased core loss and/or field-weakening ohmic loss during high-speed rotation when the interlinkage magnetic flux of magnets is enlarged and its torque density is increased during low speed rotation. Meanwhile, variable-field rotary electric machines have been known in which the field can be adjusted such that rotary electric machine characteristics (e.g., torque, outputs) are fit for working conditions.

Regarding the variable-field rotary electric machines, for instance, JP2010-57209A discloses a configuration where a wire traction device is used to pull a stator off a rotor in the axial direction. In JP2010-57209A, this enables the interlinkage magnetic flux of magnets to be decreased, thereby reducing the core loss to a low degree.

SUMMARY OF INVENTION

An aspect of the present invention provides a variable-field rotary electric machine The variable-field rotary electric machine includes: a rotor that is rotatably integrated with a shaft while an axis of the shaft is used as a rotation axis and includes a movable iron core and a displacement mechanism configured to displace the movable iron core in an axial direction of the rotation shaft. The displacement mechanism includes: a cylinder unit including a cylinder chamber to retain hydraulic fluid according to a rotor speed, a piston member connected to the movable iron core, and a sealer member provided at the piston member. The the piston member and the movable iron core are displaced in the axial direction of the rotation shaft in response to an increase or decrease in an amount of the hydraulic fluid in the cylinder chamber.

Note that this "hydraulic fluid" refers to fluid serving as both lubricating oil having a lubricating effect and coolant having a cooling effect.

DESCRIPTION OF EMBODIMENTS

Prior to describe embodiments, the variable-field rotary electric machine disclosed in JP2010-57209A is further argued. The field is adjusted by using the wire traction device for pulling a stator off in the axial direction. This makes the structure complicated and disadvantageously causes the rotary electric machine to become larger.

Embodiments of the present invention have been made in light of the above point and provide a variable-field rotary electric machine such that the field can be easily adjusted due to its simple structure and the size can be made compact, and a vehicle provided with the variable-field rotary electric machine.

The embodiments of the present invention make it possible to provide a variable-field rotary electric machine such that the field can be easily adjusted due to its simple structure and the size can be made compact, and a vehicle provided with the variable-field rotary electric machine.

Next, an embodiment of the present invention is described in detail with reference to the Drawings.

Figure 1:
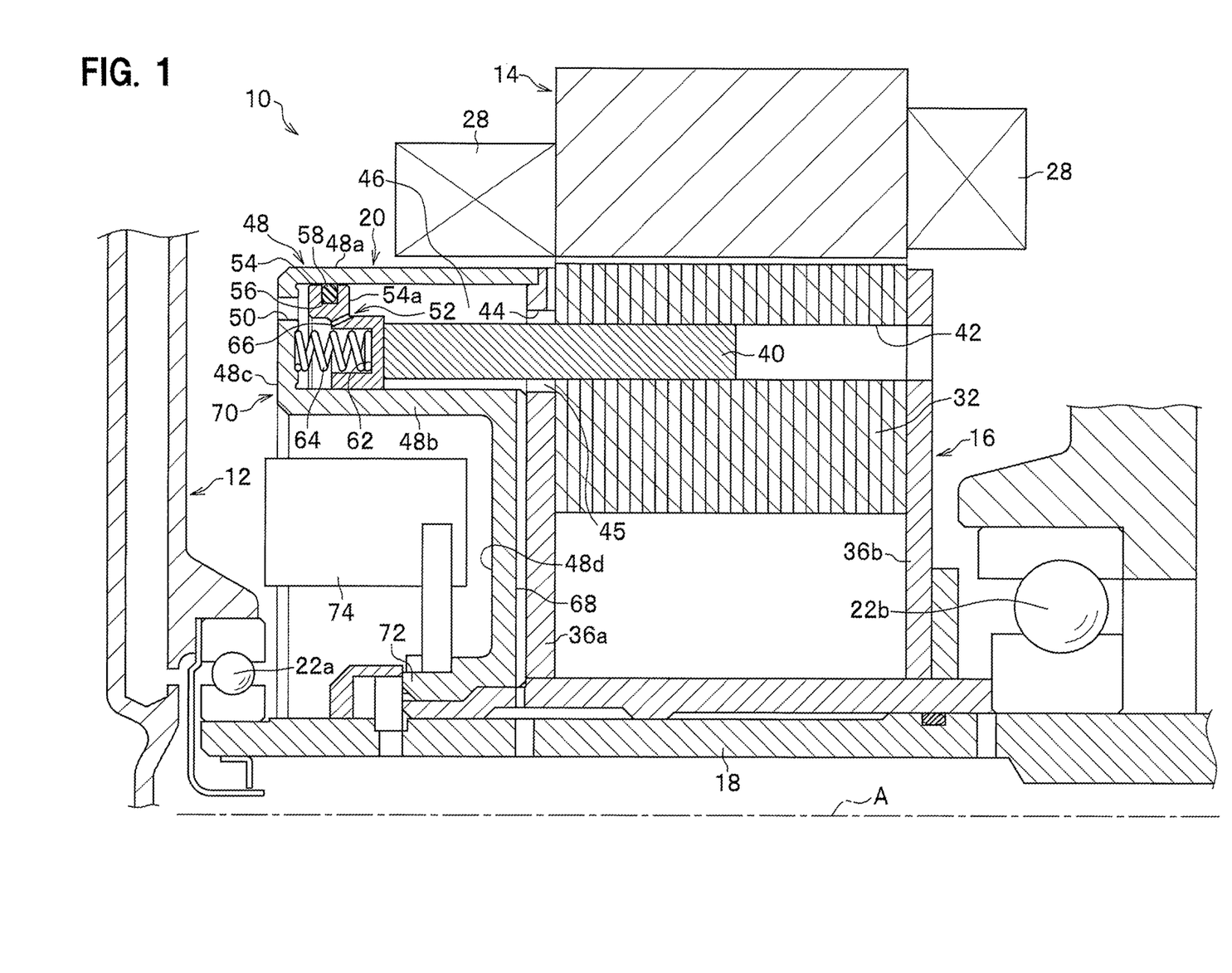
FIG. 1 is a vertical cross-sectional view schematically illustrating the configuration of a variable-field rotary electric machine according to an embodiment of the present invention.

As shown in FIG. 1, a variable-field rotary electric machine 10 according to an embodiment of the present invention (hereinafter, simply referred to as a rotary electric machine 10) is, for instance, a travel motor included in a vehicle such as a hybrid vehicle or an electric vehicle. This rotary electric machine 10 is provided with a housing 12, a stator 14, a rotor 16, a shaft (rotor shaft) 18, and a movable iron core displacement mechanism (displacement mechanism) 20.

The housing 12 houses the stator 14, the rotor 16, and the movable iron core displacement mechanism 20, and is supported rotatably by a pair of bearings 22a and 22b attached to the housing 12.

Figure 2:
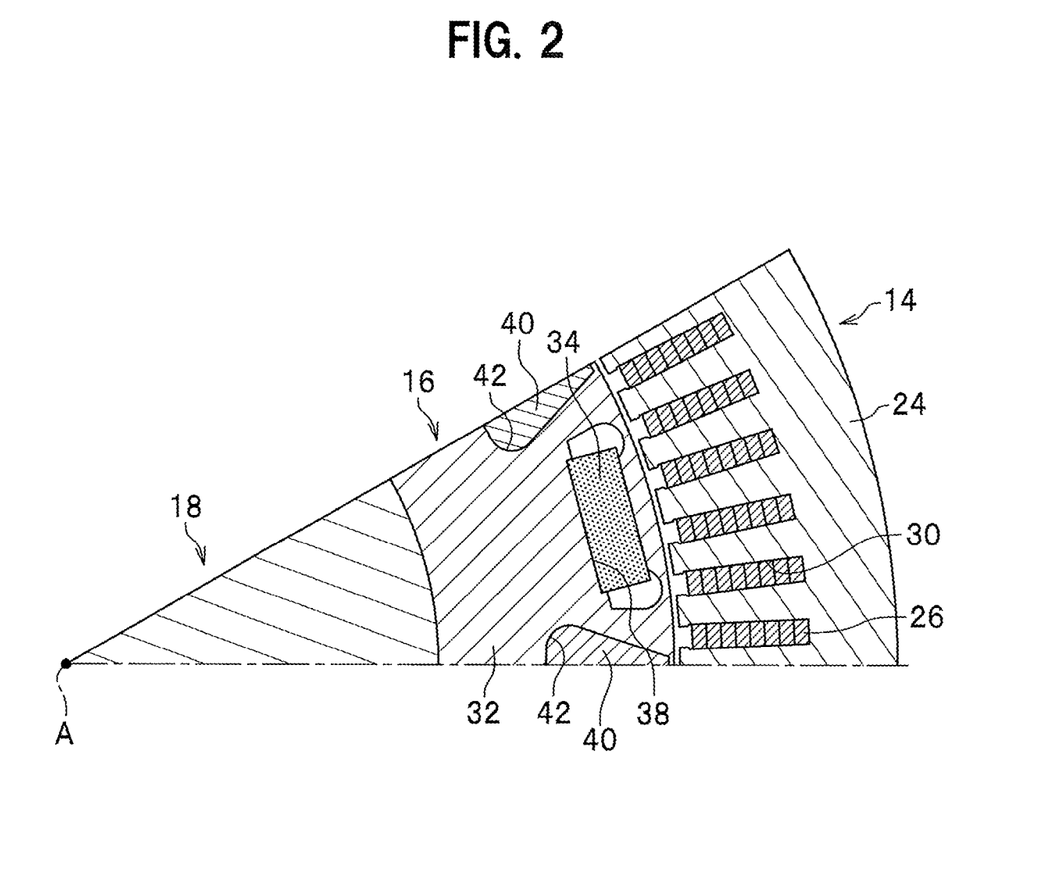
FIG. 2 is a horizontal cross-sectional view of the variable-field rotary electric machine shown in FIG. 1.

As shown in FIG. 2, the stator 14 has a stator core 24, a multilayer (e.g., a U phase, V-phase, W-phase) coil 26 attached to the stator core 24, and coil ends 28 (see FIG. 1). In the stator 14, a current flows through the coil 26 to generate a magnetic field. The stator core 24 extends in the axial direction and has a cylindrical form. The stator core 24 is configured such that a plurality of magnetic steel sheets, for example, are stacked in the axial direction. Note that the stator core 24 may be formed by subjecting soft magnetic powder to pressure molding.

The stator core 24 has coil slots 30, into which the coils 26 are inserted, arranged in the circumferential direction. The coils 26 are composed of segmented coils formed by inserting a plurality of rectangular wire-made conducting wire segments into each coil slot 30 of the stator core 24 and coupling them in portions protruding from the stator core 24 in the axial direction.

The rotor 16 includes embedded magnets. The rotor 16 is arranged on the inner side of the stator 14 in the radial direction. The rotor 16 has: a rotor core 32; permanent magnets 34 embedded in (attached to) the rotor core 32; and a pair of end plates 36a and 36b (see FIG. 1) arranged on one end surface and the other end surface of the rotor core 32 while facing each other.

The rotor core 32 extends uniformly in the axial direction in a cylindrical form, and is arranged facing the inner circumferential surface of the stator core 24. The rotor core 32 is configured such that a plurality of magnetic steel sheets, for example, are stacked in the axial direction. Note that the rotor core 32 may be formed by subjecting soft magnetic powder to pressure molding.

A shaft 18 is inserted on the radially inner side of the rotor core 32 and is fixed to a center portion of the rotor core 32 by, for instance, press fitting. The shaft 18 and the rotor core 32 are rotatably integrated while the axis A of the shaft 18 is used as a rotation axis (pivot).

In addition, predetermined circumferential angle regions of the rotor core 32 each have a magnet-mounting section 38 for mounting each permanent magnet 34. The magnet-mounting sections 38 are arranged in an outer circumferential portion of the rotor core 32 and with an equal interval while having a given distance therebetween along the circumferential direction. Each magnet-mounting section 38 has a rectangular form extending in, as a longitudinal direction, a direction perpendicular to the radial direction when viewed in the axial direction.

Each permanent magnet 34 is a rare-earth element magnet. Examples of the rare-earth element magnet include neodymium magnets, samarium-cobalt magnets, and praseodymium magnets. Each permanent magnet 34 is inserted into each magnet-mounting section 38 and is fixed to the rotor core 32 by using, for instance, a resin or adhesive.

The rotor core 32 is provided with a plurality of movable iron cores 40 arranged with an equal angle interval along the circumferential direction. Each movable iron core 40 is arranged between two magnet-mounting sections 38 adjacent in the circumferential direction.

Each movable iron core 40 is disposed in each storage slot 42 of the rotor core 32 such that the movable iron cores are adjacent in the circumferential direction and are each arranged between two permanent magnets 34 having different polarities. Each movable iron core 40 corresponds to each storage slot 42 and a cross-section perpendicular to the axis thereof has an approximately elliptic shape. This movable iron core 40 can be displaced in each storage slot 42 in the axial direction by using the movable iron core displacement mechanism 20 described below. Note that the movable iron core 40 may be formed by subjecting soft magnetic powder to pressure molding.

Each end plate 36a or 36b is formed of an annular plate having substantially the same shape as of the rotor core 32. The end plates 36a and 36b are used for preventing each permanent magnet 34, which has been mounted in each magnet-mounting section 38 of rotor core 32, from slipping off. Around the center of the end plate 36a or 36b is formed an approximately annular through-hole through which the shaft 18 penetrates.

Figure 4:
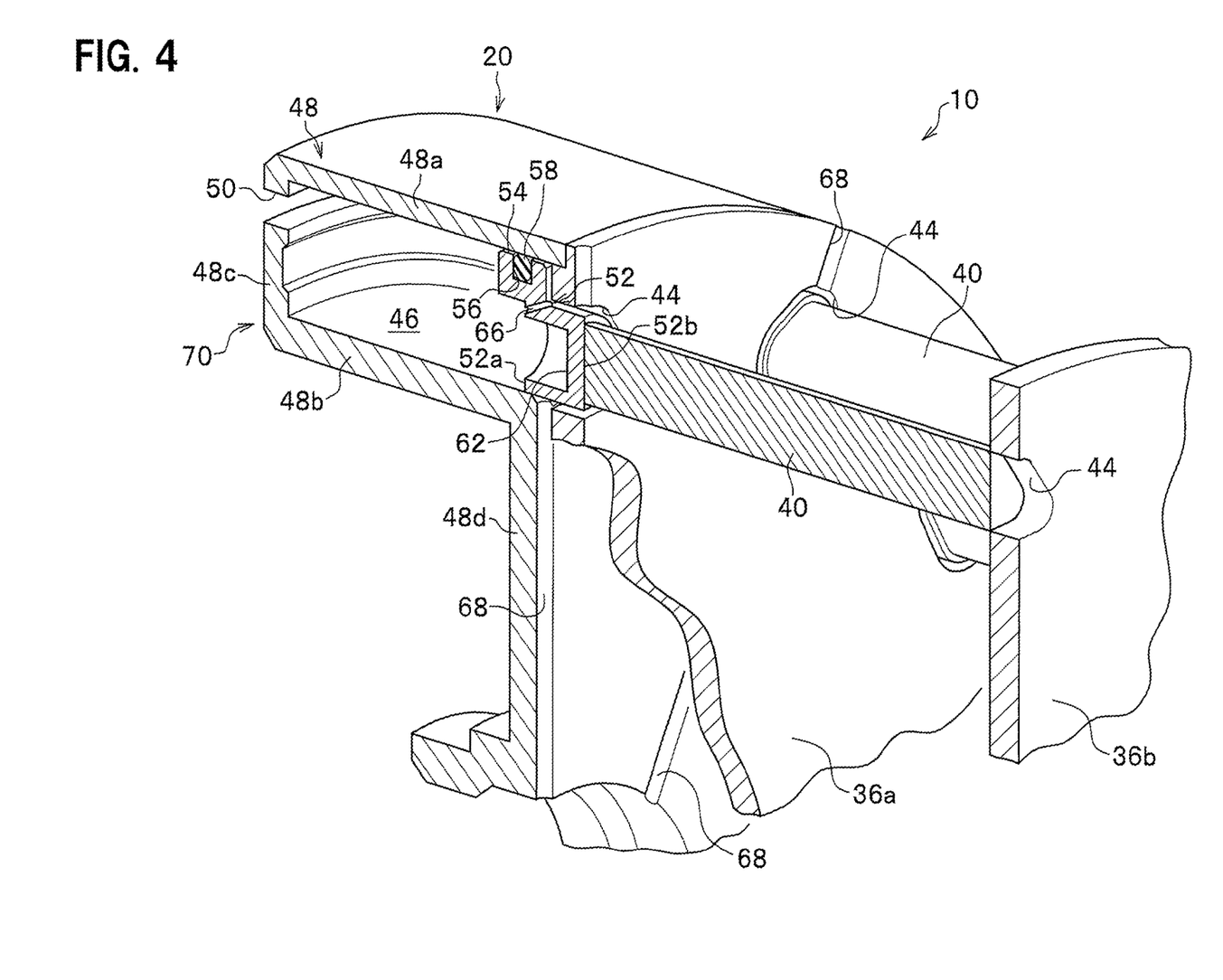
FIG. 4 is a partially exploded perspective view of the movable iron core displacement mechanism shown in FIG. 3.

The outer circumferential side of the one-side end plate 36a has through-hole portions 44 with a diameter larger than the diameter of each movable iron core 40 when viewed in the axial direction. Each through-hole portion 44 has a shape corresponding to an approximately elliptic cross-section that is a cross-section perpendicular to the axis of each movable iron core 40 when viewed from the lateral surface. Each movable iron core 40 can be moved reciprocally through each through-hole portion 44. There is a clearance 45 at a position between the inner diameter of each through-hole portion 44 and the outer diameter of each movable iron core 40. This clearance 45 is used to discharge, to the outside of the cylinder housing 48, hydraulic fluid that has been retained in the below-described cylinder chamber 46.

Figure 3:
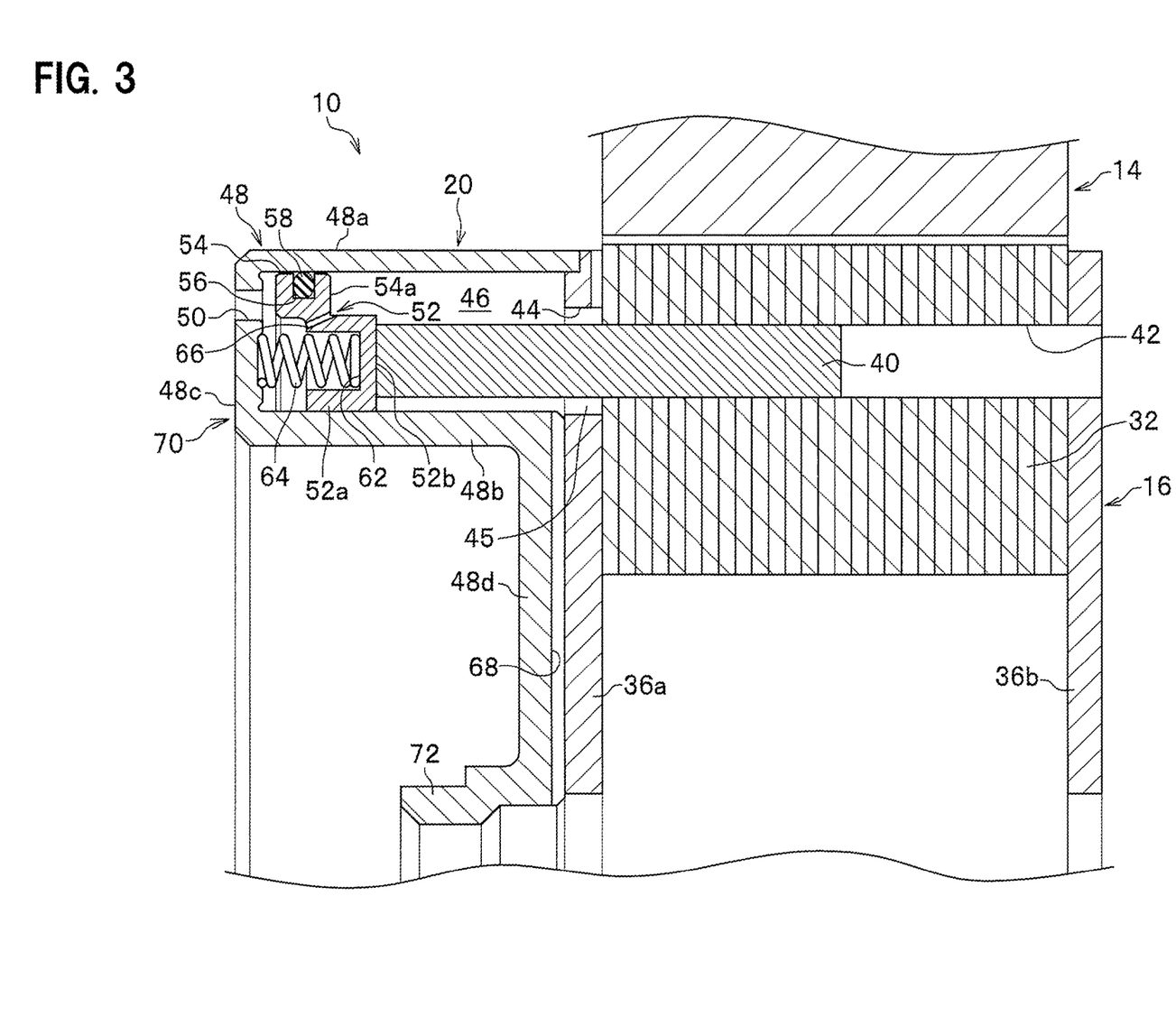
FIG. 3 is a vertical cross-sectional view of a movable iron core displacement mechanism for the variable-field rotary electric machine shown in FIG. 1.

The movable iron core displacement mechanism 20 can displace the plurality of movable iron cores 40 (which are arranged, on the outer circumferential side of the rotor core 32 when viewed from the lateral surface, with an equal angle interval along the circumferential direction) in the axial direction of the rotation shaft (axis A) simultaneously or approximately simultaneously.

This movable iron core displacement mechanism 20 has, on a one-end surface of the rotor core 32, the cylinder housing 48 that protrudes outwardly from the one-side end plate 36a in the axial direction of the rotation shaft. This cylinder housing 48 is configured by including: an outer wall part 48a that is positioned on the outer side; an inner wall part 48b that is positioned on the inner side; an annular side wall part 48c that connects the lateral surface of the outer wall part 48a and the lateral surface of the inner wall part 48b; and a disk-like wall part 48d that faces the one-side end plate 36a.

The outer wall part 48a stands along the outer-diameter side of the rotor core 32 and has a cylindrical form. The inner wall part 48b has a diameter smaller than that of the outer wall part 48a and stands along the inner-diameter side of the rotor core 32 and has a cylindrical form. The outer wall part 48a and the inner wall part 48b have the same length when viewed in a direction substantially parallel to the axial direction of the shaft 18. The annular side wall part 48c is an annular body that connects the lateral surface of the outer wall part 48a and the lateral surface of the inner wall part 48b that are arranged in substantially parallel to each other while keeping a predetermined space distance in the radial direction. The annular side wall part 48c has a plurality of hydraulic pressure-releasing slits 50 along the circumferential direction. Each hydraulic pressure-releasing slit 50 has an approximately arc shape when viewed from the lateral surface and is arranged, with a predetermined space distance therebetween, at a position on the outer-diameter side of the annular side wall part 48c, which position corresponds to the position of each piston member 52 (sealer-mounted part 54).

In view of the cross-section, the cylinder chamber 46 formed is an inner space enclosed by: the outer wall part 48a that is positioned on the upper side; the inner wall part 48b that is positioned on the lower side; and the annular side wall part 48c that vertically connects one side of the outer wall part 48a and one side of the inner wall part 48b. The cylinder chamber 46 is configured to retain hydraulic fluid in accordance with the rotation speed of the rotor 16 as described below. Note that this "hydraulic fluid" refers to fluid serving as both lubricating oil having a lubricating effect and coolant having a cooling effect.

Each cylinder chamber 46 houses each piston member 52 that can be displaced along the axis of the cylinder chamber 46. This piston member 52 is connected to one end portion in the axial direction of the corresponding movable iron core 40 and is integrally displaced with the movable iron core 40. The piston member 52 is connected to the one end portion of each movable iron core 40 in the axial direction.

Figure 5:
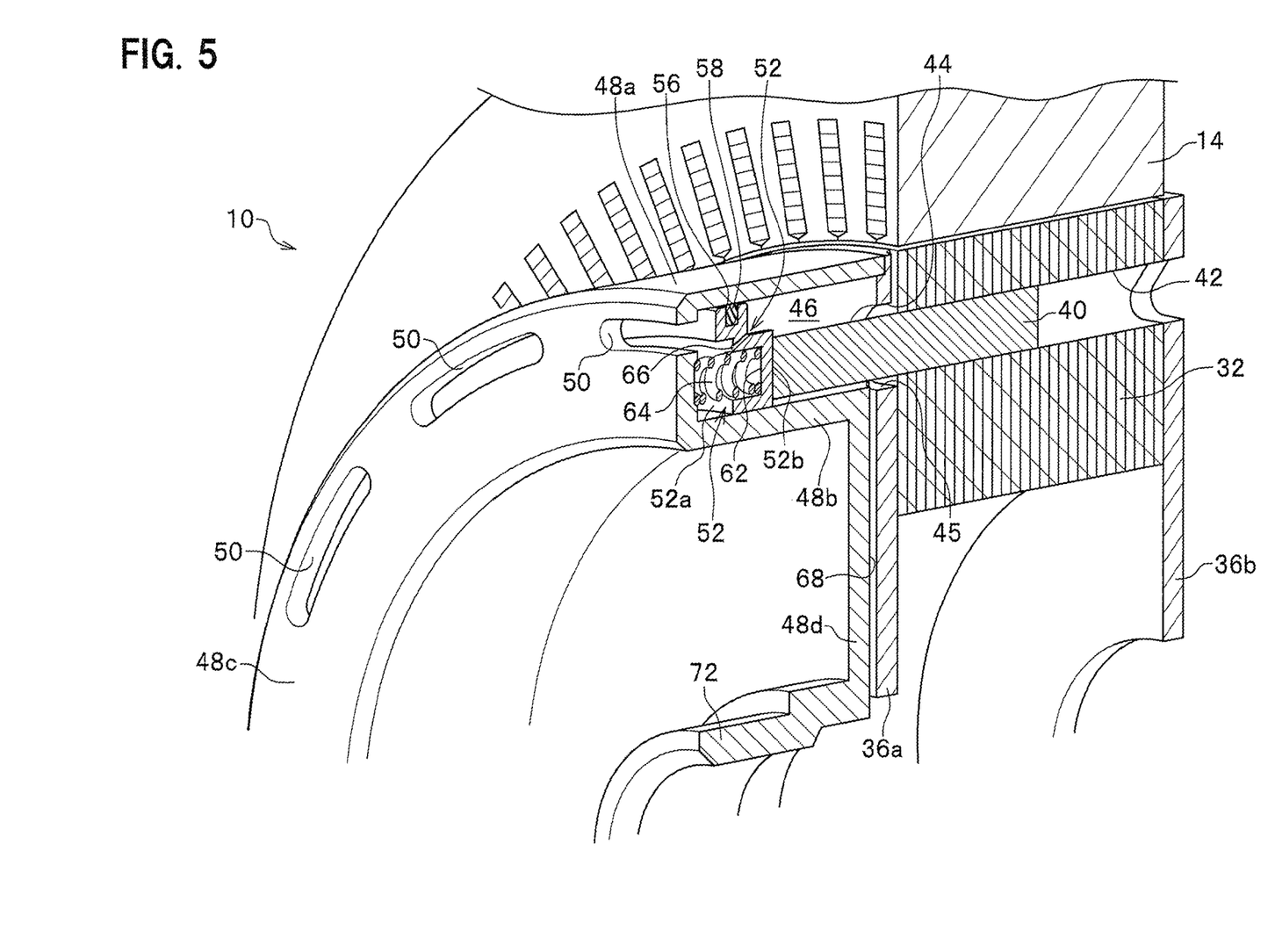
FIG. 5 is a partially cross-sectional perspective view of the movable iron core displacement mechanism shown in FIG. 3.
Figure 6:
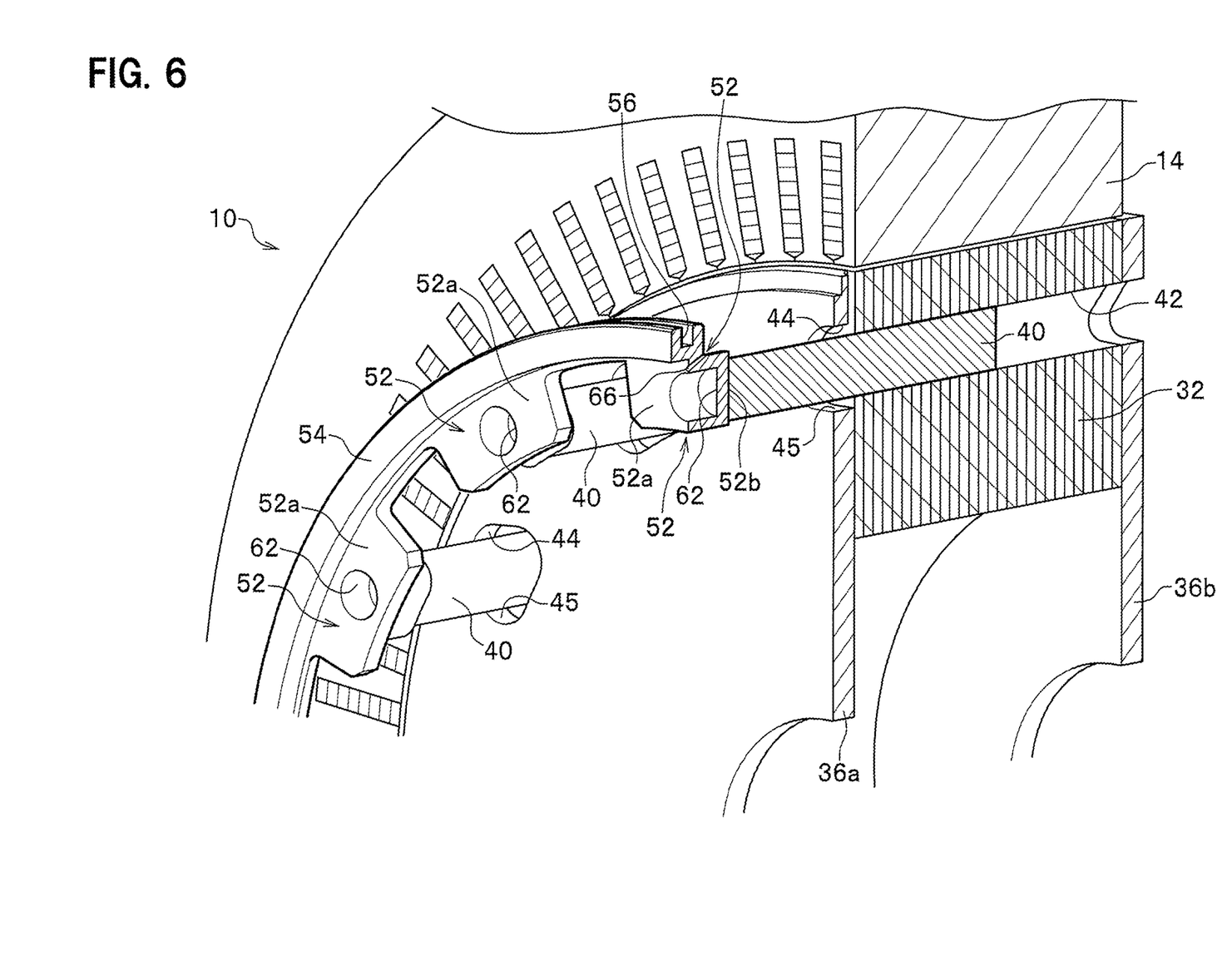
FIG. 6 is a partially cross-sectional perspective view illustrating a state in which a cylinder housing is removed from the state illustrated in FIG. 5.

This piston member 52 has: a piston main body 52*a* that is an approximately rectangular plate body when viewed from the lateral surface; a connecting part 52*b* that protrudes from the piston main body 52*a* toward the movable iron core 40 side and is connected to the one end portion of the movable iron core 40 in the axial direction; and a sealer-mounted part 54 that is continuously provided to the piston main body 52*a* and is positioned outwardly of the connecting part 52*b* and the movable iron core 40. The connecting part 52*b* is connected to the movable iron core 40 and they share the axis. The piston main body 52*a* of each piston member 52 is arranged, via the sealer-mounted part 54 along the circumferential direction, intermittently with a predetermined angle interval. An approximately rectangular gap portion 55 is provided between the piston main bodies 52*a* of the piston members 52 adjacent along the circumferential direction. This gap portion 55 serves as a gap for releasing a hydraulic pressure.

The sealer-mounted part 54 is an annular body extending in substantially parallel to the outer circumferential portion of the rotor 16 in the circumferential direction. The sealer-mounted part 54 has an approximately rectangular cross-section and has an annular groove 56 that is open to the inner wall of the outer wall part 48*a*. A piston gasket (sealer member) 58 is attached to this annular groove 56.

Note that in this embodiment, a single piston gasket 58, for instance, is arranged on only the outer-diameter side of the piston member 52. However, as illustrated in another embodiment described below, piston gaskets (a first piston gasket 60*a* and a second piston gasket 60*b* described below) may be arranged on both the outer-diameter and inner-diameter sides of the piston member 52.

This piston gasket 58 is slidably attached to the inner wall (ceiling surface) of the outer wall part 48*a* and exerts a sealing function so as to separate the cylinder chamber 46. The sealer-mounted part 54, which is composed of an annular body, can couple and connect the plurality of piston members 52 in the circumferential direction, which piston members are arranged along the outer circumferential portion of the rotor 16. The piston gasket 58 that is mounted on the annular groove 56 is positioned outwardly of the connecting part 52*b* and the movable iron core 40, is arranged in substantially parallel to the outer circumferential portion of the rotor 16, and has an annular continuous form.

Regarding the connecting part 52*b* of the piston member 52, a cylindrical recessed portion 62 is provided on a side opposite to the side connected to the movable iron core 40. This recessed portion 62 functions as a spring-receiving seat on which another end portion of a return spring (biasing means) 64 is seated. Further, the cylinder chamber 46-facing inner wall 54*a* of the sealer-mounted part 54 is pressurized by hydraulic fluid retained on the outer-diameter side of the cylinder chamber 46 and serves as a pressure-receiving surface that is given pressing force of the hydraulic fluid so as to displace the piston member 52.

The return spring 64 made of a coiled spring is arranged between the connecting part 52*b* of the piston member 52 and the annular side wall part 48*c*. One end portion of the return spring 64 is attached to the spring-receiving seat of the annular side wall part 48*c* and the other end portion is attached to the recessed portion 62 of the connecting part 52*b*. This return spring 64 functions as a return spring such that after the piston member 52 and the corresponding movable iron core 40 are displaced toward one side in the axial direction of the rotation shaft by hydraulic fluid retained in the cylinder chamber 46, its spring force is used to return the movable iron core 40 to the original position in the storage slot 42. Note that FIG. 4 illustrates a state where the movable iron core 40 is in the original position and the storage slot 42 is not depicted.

Between the sealer-mounted part 54 and the connecting part 52*b* of the piston member 52 is provided a communication passage 66 that communicates one side (a side on which hydraulic fluid is retained) and the other side (a side from which the retained hydraulic fluid is discharged) of the cylinder chamber 46 that has been sealed by the piston gasket 58. This communication passage 66 can be used to discharge, to the outside, the hydraulic fluid retained on the outer-diameter side of the cylinder chamber 46.

On the radially inner side of the inner wall part 48*b* is provided the disk-like wall part 48*d* substantially perpendicular to the inner wall part 48*b*. The end plate 36*a*-facing inner wall of the disk-like wall part 48*d* is provided with a plurality of hydraulic fluid passages 68 that are in communication with each cylinder chamber 46 and are used to supply hydraulic fluid to each cylinder chamber. The plurality of hydraulic fluid passages 68 are arranged extending in the radial direction.

Note that a cylinder unit 70 is configured by including the piston member 52, the cylinder chamber 46, and the piston gasket 58 as described above. This cylinder unit 70 is arranged on the inner-diameter side of each coil end 28 of the coil 26.

The disk-like wall part 48*d* is positioned on the inner-diameter side that is close to the shaft 18 and has an inner flange 72 that protrudes in the axial direction of the shaft 18. This inner flange 72 has a resolver 74 that detects the rotational angle of the rotary electric machine 10. This resolver 74 includes: a resolver stator that is fixed to a casing; and a resolver rotor that is press-fit to the shaft and rotates integrally with the shaft.

Figure 7:
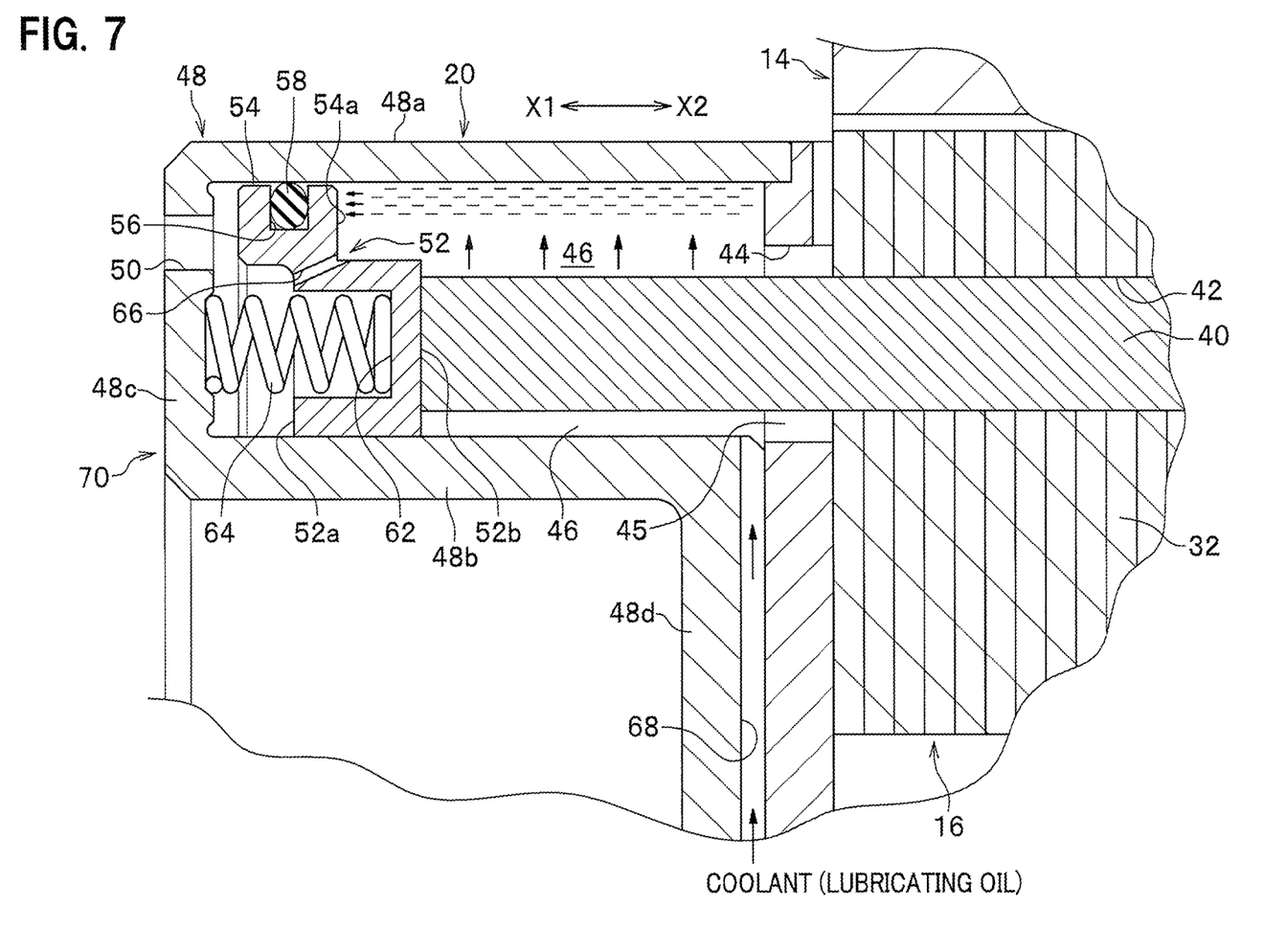
FIG. 7 is a diagram illustrating how the movable iron core displacement mechanism shown in FIG. 3 works.
Figure 8:
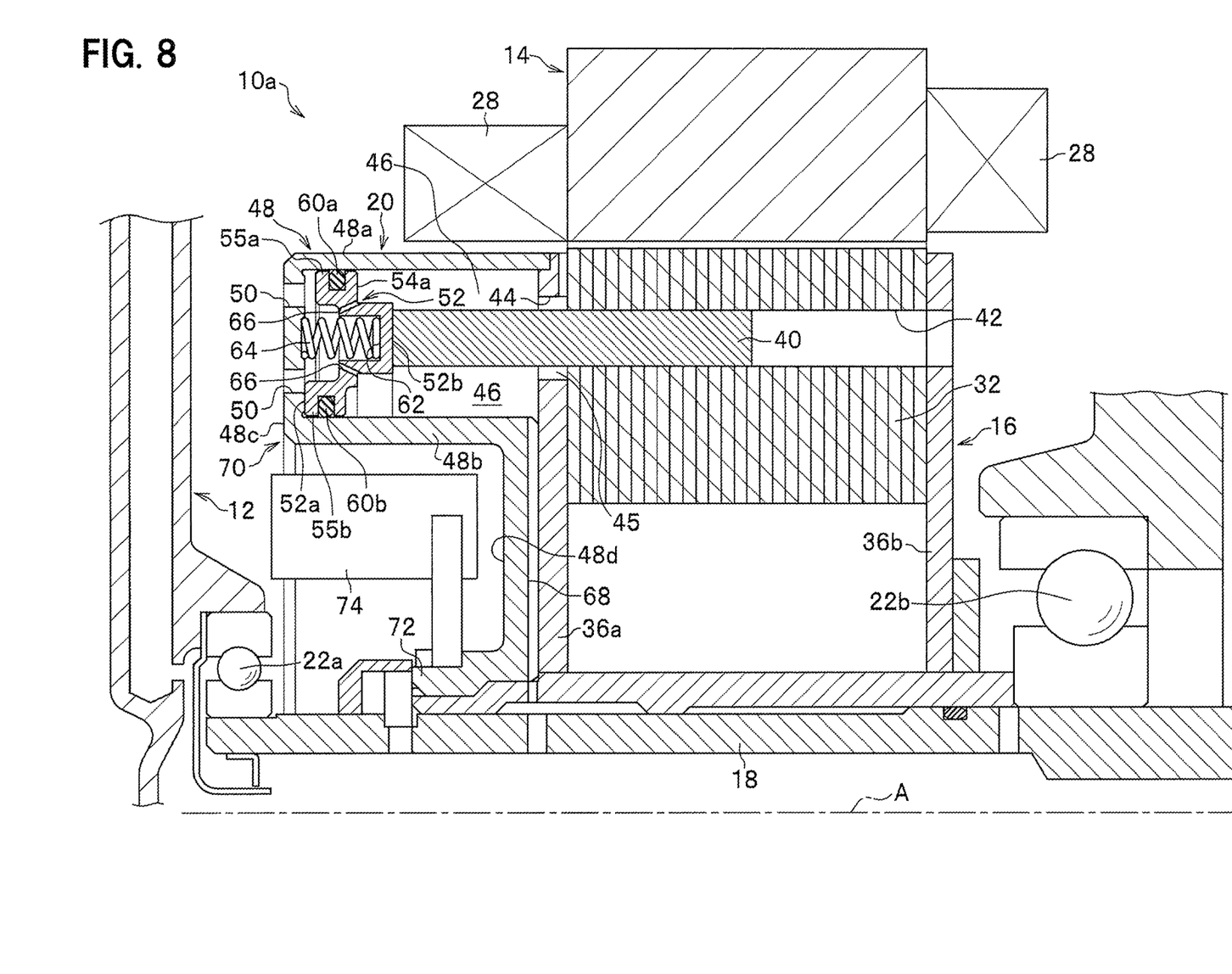
FIG. 8 is a vertical cross-sectional view schematically illustrating the configuration of a variable-field rotary electric machine according to another embodiment of the present invention.
Figure 9:
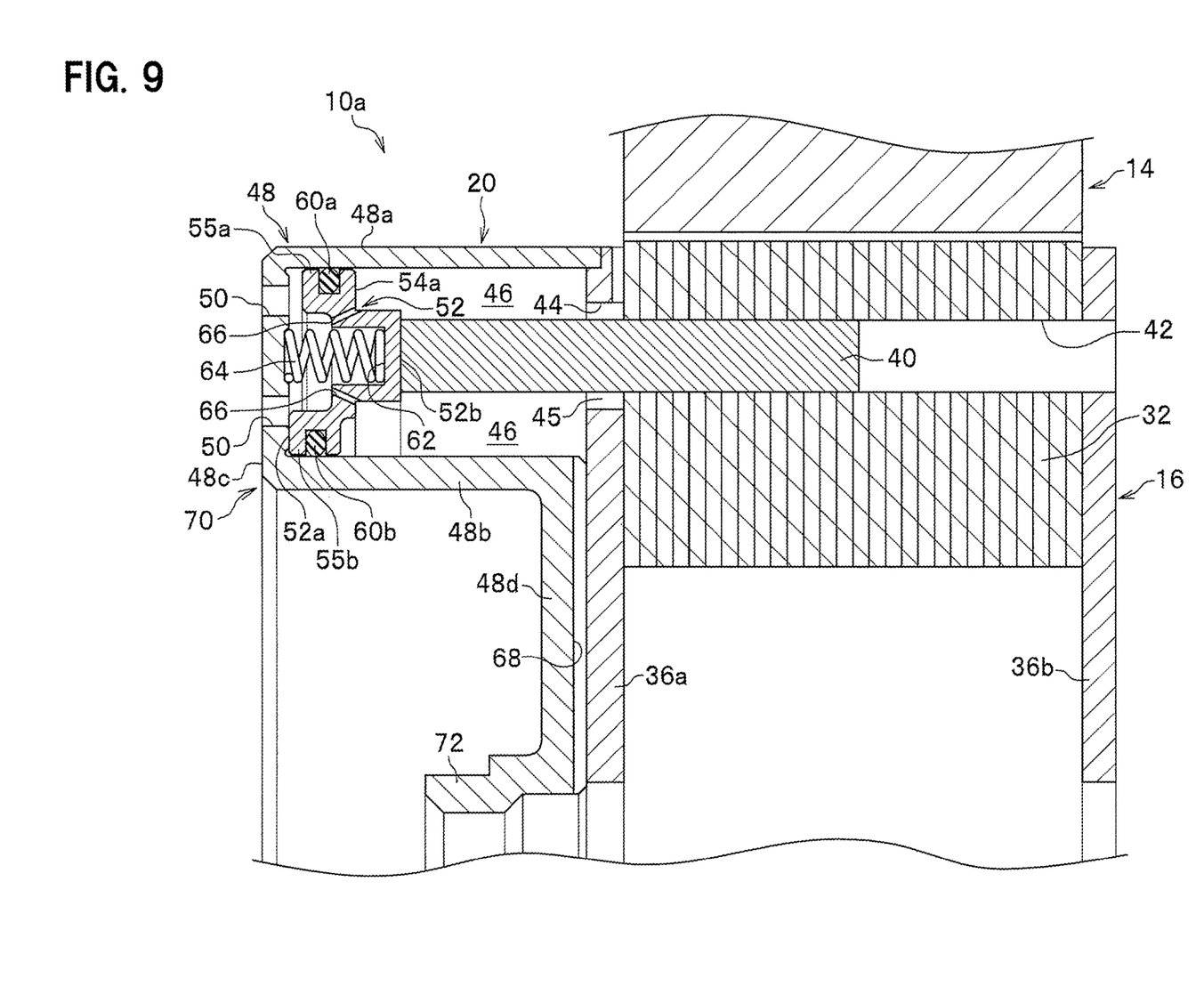
FIG. 9 is a vertical cross-sectional view of a movable iron core displacement mechanism for the variable-field rotary electric machine shown in FIG. 8.

The rotary electric machine 10 according to this embodiment is basically configured as above. Next, the advantageous effects thereof are explained. FIG. 7 is a diagram illustrating how the movable iron core displacement mechanism works.

For example, a pump (not shown) is used to supply hydraulic fluid (lubricating oil, hydraulic oil) to the rotary electric machine 10. This hydraulic fluid is supplied from the shaft 18 side to the cylinder chamber 46 via the hydraulic fluid passage 68 formed at the inner wall of the disk-like wall part 48*d*.

In addition, rotation of the rotor 16 of the rotary electric machine 10 causes co-rotation of the piston member 52 and the rotor core 32 to give the piston member 52 centrifugal force. As shown in FIG. 7, hydraulic fluid, which has been discharged via the hydraulic fluid passage 68 into the cylinder chamber 46, is retained only on the outer-diameter side of the cylinder chamber 46 due to the centrifugal force. The hydraulic fluid, which has been retained on the outer-diameter side of the cylinder chamber 46, is prevented from entering another cylinder chamber 46. The hydraulic fluid of that cylinder chamber 46 is not introduced because of the piston gasket 58 disposed at the piston member 52.

When the rotor 16 of the rotary electric machine 10 rotates at a predetermined high speed (high speed rotation), centrifugal force against the hydraulic fluid (centrifugal hydraulic pressure), which has been retained on the outer-diameter side of the cylinder chamber 46, causes the hydraulic fluid pressure to increase. The hydraulic fluid with the increased pressure (centrifugal hydraulic pressure) pushes the inner wall 54a of the sealer-mounted part 54 of the piston member 52 toward the small arrow direction as shown in FIG. 7. That is, the inner wall 54a of the sealer-mounted part 54, which wall faces the cylinder chamber 46 of the piston member 52, acts as a pressure-receiving surface given pressing force (centrifugal hydraulic pressure) by the hydraulic fluid. This pressing force (centrifugal hydraulic pressure) causes the piston member 52 and the movable iron core 40 to be integrally displaced, in the axial direction (the arrow X1 direction of FIG. 7) of the rotation shaft, against the spring force of the return spring 64.

In other words, when the rotor 16 of the rotary electric machine 10 rotates at a predetermined high rotation speed (high speed rotation), centrifugal force is given to the hydraulic fluid, which has been retained on the outer-diameter side of the cylinder chamber 46, so as to pressurize the hydraulic fluid. The pressure added to the hydraulic fluid becomes larger as the centrifugal force increases. This pressurized hydraulic fluid causes pressing force that pushes the pressure-receiving surface (inner wall 54a) of the piston member 52. Consequently, this pressing force causes the piston member 52 to be displaced, against the spring force of the return spring 64, in the axial direction (the arrow X1 direction) of the rotation shaft. The movable iron core 40, which is connected to the piston member 52, is integrally displaced, with the piston member 52, in the axial direction (the arrow X1 direction) of the rotation shaft.

As a result, the movable iron core 40 is displaced from the original position, where it is arranged in one of the storage slots 42 of the rotor core 32, in the axial direction (the arrow X1 direction) of the rotation shaft and is then moved to the cylinder chamber 46. Note that the predetermined high rotation speed of the rotor 16 is preset based on required performance of the rotary electric machine 10 and/or the size of the rotary electric machine 10, etc.

Meanwhile, the speed of the rotor 16 of the rotary electric machine 10 may be decreased from the predetermined high rotation speed to a low rotation speed. In this case, magnetic attraction, which retracts the movable iron core 40 into the storage slot 42, and spring force, which biases the return spring 64 to extend, cause the piston member 52 to be pushed in a direction (the arrow X2 direction) opposite to the previous axial direction of the rotation shaft. As a result, the magnetic attraction and the spring force can help push and return the piston member 52 and the movable iron core 40 in the direction opposite to the previous direction. This causes them to be displaced in the axial direction (the arrow X2 direction) of the rotation shaft. Thus, the movable iron core 40 is returned to the original position of the storage slot 42.

As such, in this embodiment, when the rotor 16 of the rotary electric machine 10 rotates at a predetermined high rotation speed, the resulting centrifugal force pressurizes the hydraulic fluid, which has been retained on the outer-diameter side of the cylinder chamber 46. This can generate pressing force that pushes the pressure-receiving surface of the piston member 52 in the axial direction (the arrow X1 direction). Accordingly, in this embodiment, the piston member 52 and the movable iron core 40 can be integrally displaced in the axial direction (the arrow X1 direction) of the rotation shaft.

In addition, in this embodiment, the magnetic attraction, which acts on the movable iron core 40, and the spring force of the return spring 64 help generate the pressing force, that is, cause the piston member 52 to be pushed in the axial direction (the arrow X2 direction) opposite to the previous direction. Accordingly, the piston member 52 and the movable iron core 40 can be pushed and returned to the original position.

Here, this embodiment provides the above movable iron core displacement mechanism 20. This enables a magnetic field to be easily adjusted due to the simple structure, and it is possible to produce the rotary electric machine 10 that can be made compact.

In addition, in this embodiment, the cylinder unit 70 including the piston member 52 is arranged on the inner-diameter side of each coil end 28 of the coil 26. This allows for effective use of space in this embodiment, thereby capable of successfully saving the space.

Further, in this embodiment, the hydraulic fluid that has been supplied to the cylinder chamber is retained only in a space between the outer circumference surface of each movable iron core and the inner wall on the outer-diameter side of the corresponding cylinder chamber. This can avoid providing the piston gasket and the sealer-mounted part throughout the outer circumference of the piston member. Thus, it is possible to make the piston gasket and the sealer-mounted part simple and weigh light.

Furthermore, in this embodiment, the return spring is provided such that the piston member is displaced on one side in the axial direction (the arrow X1 direction) of the rotation shaft and is then pushed and returned to the other side in the direction (the arrow X2 direction) opposite to the previous one. Accordingly, in this embodiment, once displaced toward the one side, the piston member can be reliably returned to the original position on the other side due to the magnetic attraction of the movable iron core. Note that, in this embodiment, the return spring is made of a coiled spring. However, examples of the biasing means that may be used include, but are not limited to, plate springs.

Moreover, this embodiment is provided with a hydraulic fluid-discharging means for discharging hydraulic fluid from the cylinder chamber to the outside thereof. This hydraulic fluid-discharging means is configured by including: the plurality of hydraulic pressure-releasing slits 50 arranged along the circumferential direction of the annular side wall part 48c; a communication passage 66 formed between the connecting part 52b and the sealer-mounted part 54 of the piston member 52; and the clearance 45 formed at a position between the inner diameter of each through-hole portion 44 of the end plate and the outer diameter of each movable iron core 40. Providing such a hydraulic fluid-discharging means enables the hydraulic fluid, which has been retained on the outer-diameter side of the cylinder chamber 46, to be discharged smoothly toward the outside.

In addition, use of the hydraulic fluid that has been discharged outside the cylinder chamber makes it possible to exert a cooling effect on external parts such as a resolver. Further, providing the hydraulic fluid-discharging means makes it possible to easily pressurize the hydraulic fluid that is retained only on the outer-diameter side of the cylinder chamber, thereby avoiding giving centrifugal force to (avoiding pressurizing) the hydraulic fluid that flows on the inner-diameter side of the cylinder chamber. Furthermore, providing the hydraulic fluid-discharging means makes it possible to preferentially avoid the situation where the hydraulic fluid remaining in the cylinder chamber inhibits the piston member displacement, so that the piston member can be displaced reliably and stably.

Moreover, in this embodiment, the piston gasket attached to the sealer-mounted part of the piston member is arranged on the outer-diameter side of the piston member, is arranged in substantially parallel to the outer circumference of the rotor, and has an annular continuous form. This can elicit reliable and stable sealing performance for the hydraulic fluid that has been retained on the outer-diameter side of the piston member.

The following describes a rotary electric machine 10 according to another embodiment of the present invention.

Note that the same elements as of the above embodiment shown in FIGS. 1 to 7 have the same reference numerals so as to avoid redundancy.

As shown in FIGS. 8 to 12 of another embodiment, the sealer member includes: a first piston gasket 60a arranged on the outer-diameter side of the piston member 52; and a second piston gasket 60b arranged on the inner-diameter side of the piston member 52. This point is a difference from the above embodiment. The first piston gasket 60a and the second piston gasket 60b are arranged in substantially parallel to the outer circumferential portion of the rotor 16, and each have an annular continuous form.

Figure 10:
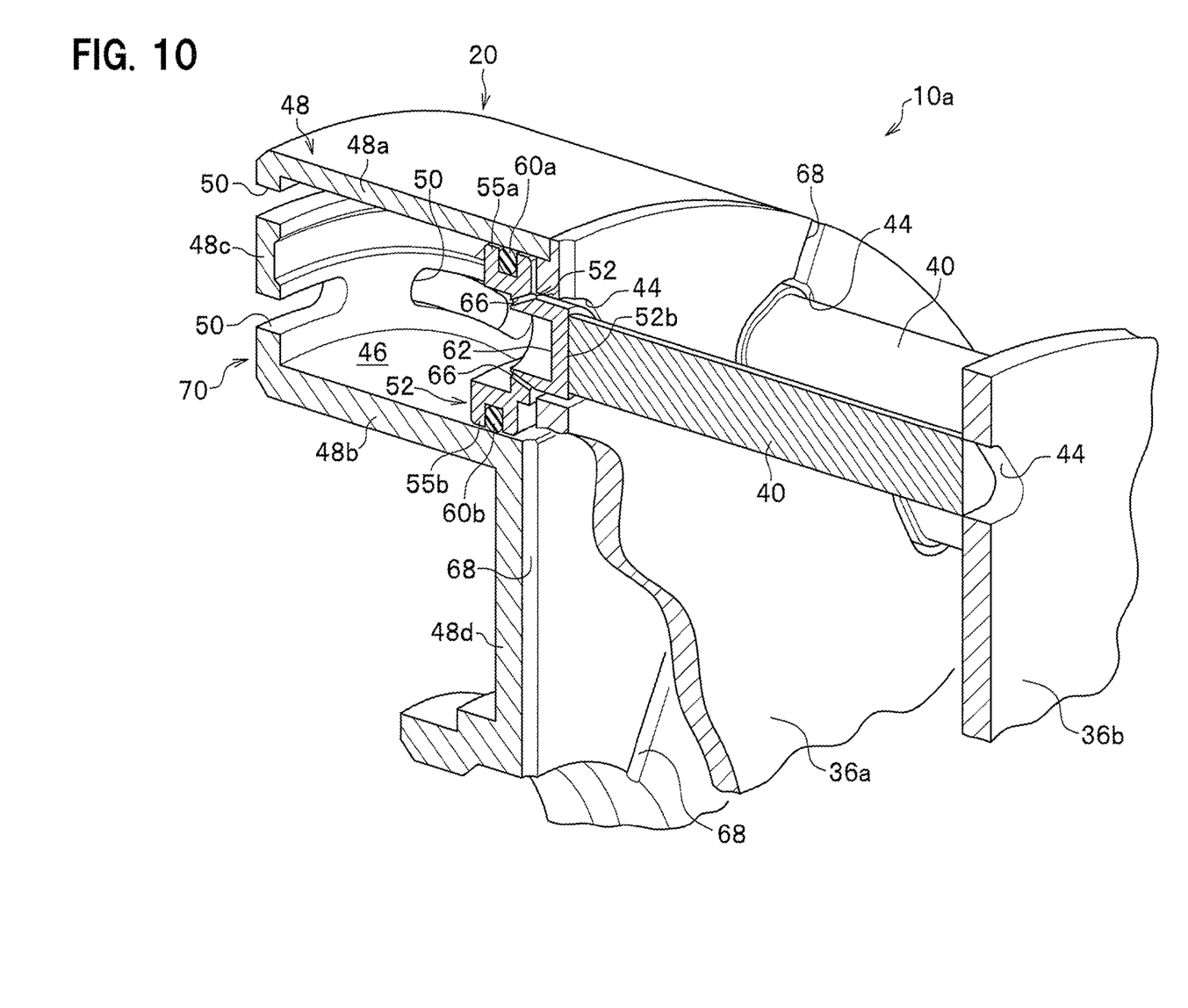
FIG. 10 is a partially exploded perspective view of the movable iron core displacement mechanism shown in FIG. 9.
Figure 11:
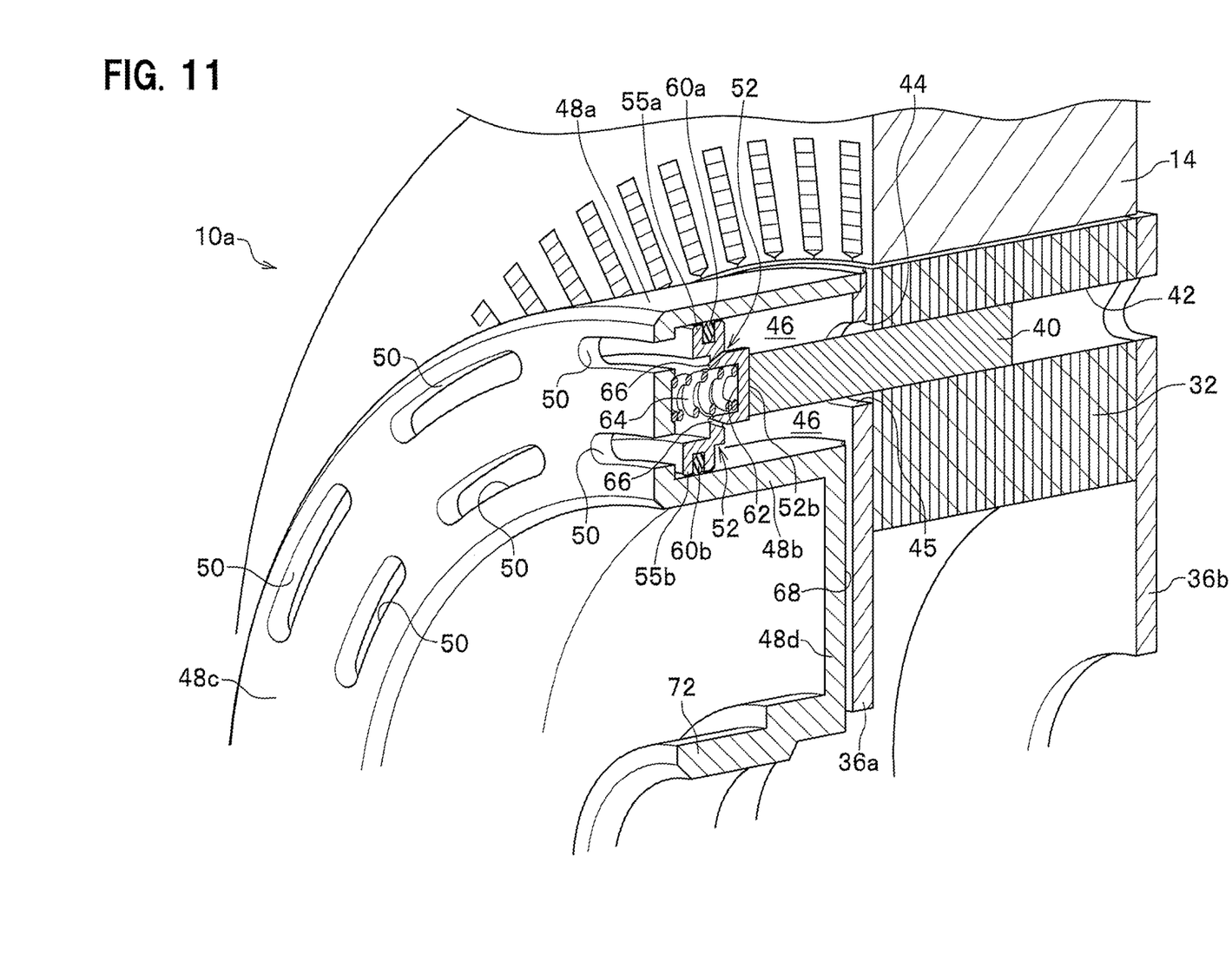
FIG. 11 is a partially cross-sectional perspective view of the movable iron core displacement mechanism shown in FIG. 9.

In addition, the other embodiment is provided with: a first sealer-mounted part 55a on which the first piston gasket 60a is mounted along an annular groove 56; and a second sealer-mounted part 55b on which the second piston gasket 60b is mounted along an annular groove 56.

In the other embodiment, the first piston gasket 60a is arranged on the outer-diameter side of the piston member 52 and the second piston gasket 60b is arranged on the inner-diameter side of the piston member 52. This arrangement allows for a stable attitude when the piston member 52 is displaced in the axial direction. In addition, because the first piston gasket 60a is arranged on the outer-diameter side and the second piston gasket 60b is arranged on the inner-diameter side, this arrangement can increase a response to the initial action of the piston member 52 when and immediately before the speed of the rotor 16 reaches the predetermined high rotation speed.

Figure 12:
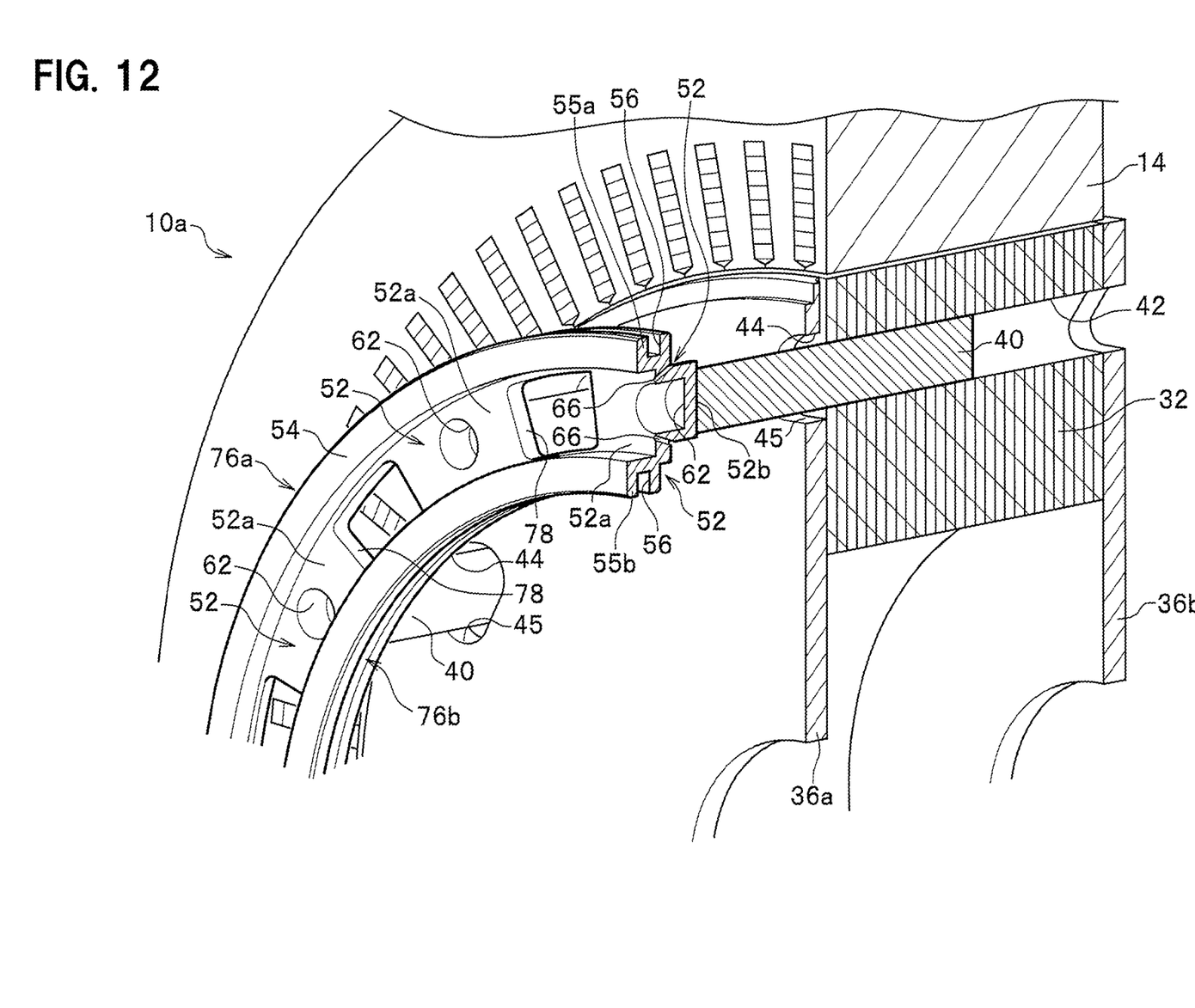
FIG. 12 is a partially cross-sectional perspective view illustrating a state in which a cylinder housing is removed from the state illustrated in FIG. 11.

Further, in the other embodiment, as shown in FIG. 12, there are a first annular body 76a having the first sealer-mounted part 55a arranged on the outer-diameter side and a second annular body 76b having the second sealer-mounted part 55b arranged on the inner-diameter side. These bodies connect a plurality of piston main bodies 52a arranged with a predetermined angle interval. At that time, as shown in FIG. 12, between the adjacent piston main bodies 52a is provided a rectangular hole section (hydraulic fluid-discharging means) 78 having an approximately rectangular shape when viewed from the lateral side. This rectangular hole section 78 can be used to discharge hydraulic fluid to the outside of the cylinder chamber 46 so as to release the pressure (centrifugal hydraulic pressure) of the hydraulic fluid.

Note that because the other configurations and the advantageous effects of the other embodiment are identical to those of the above embodiment shown in FIGS. 1 to 7, the detailed description is omitted.

Such a rotary electric machine 10 or 10a may be mounted on a vehicle (not shown). This enables a magnetic field to be easily adjusted due to the simple structure, and it is possible to produce the vehicle that can be made compact.

Note that in the above embodiment and the other embodiment, examples of the displacement mechanism include, but are not limited to, the movable iron core displacement mechanism 20 by which each movable iron core 40 is displaced in the axial direction of the rotation shaft. For instance, a permanent magnet displacement mechanism may be adopted as the displacement mechanism. This permanent magnet displacement mechanism may be used to displace each permanent magnet 25 in the axial direction of the rotation shaft.

REFERENCE SIGNS LIST 10, 10a Rotary electric machine
16 Rotor
20 Movable iron core displacement mechanism (Displacement mechanism)
24 Stator core
28 Coil end
40 Movable iron core
46 Cylinder chamber
50 Hydraulic pressure-releasing slit (Hydraulic fluid-discharging means)
52 Piston member
58 Piston gasket (Sealer member)
60a First piston gasket (Sealer member)
60b Second piston gasket (Sealer member)
64 Return spring (Biasing means)
66 Communication passage (Hydraulic fluid-discharging means)
70 Cylinder unit

The invention claimed is:

1. A variable-field rotary electric machine comprising:
a rotor that is rotatably integrated with a shaft while an axis of the shaft is used as a rotation axis and includes a movable iron core, and
a displacement mechanism configured to displace the movable iron core in an axial direction of the rotation shaft,
wherein the displacement mechanism comprises:
a cylinder unit comprising a cylinder chamber, a piston member,
and a sealer member,
the cylinder chamber configured to retain hydraulic fluid in accordance with a rotation speed of the rotor,
the piston member connected to the movable iron core at one end portion in an axial direction of the movable iron core and provided so as to be able to be displaced along an axis of the cylinder chamber,
the sealer member provided at the piston member,
wherein the piston member is displaced in the axial direction of the rotation shaft in response to an increase or decrease in a retention amount of the hydraulic fluid in the cylinder chamber, so that the movable iron core connected to the piston member is displaced in the axial direction of the rotation shaft.

2. The variable-field rotary electric machine according to claim 1, further comprising a stator core and a coil end, wherein the cylinder unit is arranged on an inner-diameter side of the coil end.

3. The variable-field rotary electric machine according to claim 1, wherein the hydraulic fluid that has been supplied to the cylinder chamber is retained only in a space between an outer circumference surface of the movable iron core and an inner wall of the cylinder chamber on an outer-diameter side.

4. The variable-field rotary electric machine according to claim 1, further comprising a biasing unit configured such that after the piston member is displaced on one side in the axial direction of the rotation shaft, the piston member is pushed and returned to the other side opposite to the one side.

5. The variable-field rotary electric machine according to claim 1, further comprising a hydraulic fluid-discharging means for discharging the hydraulic fluid from the cylinder chamber to an outside of the cylinder chamber.

6. The variable-field rotary electric machine according to claim 1, wherein the sealer member is arranged on an outer-diameter side of the piston member, is arranged in substantially parallel to an outer circumference portion of the rotor, and has an annular continuous form.

7. The variable-field rotary electric machine according to claim 1, wherein the sealer member comprises a first piston gasket that is arranged on an outer-diameter side of the piston member and a second piston gasket that is arranged on an inner-diameter side of the piston member; and the first piston gasket and the second piston gasket are arranged in substantially parallel to an outer circumference portion of the rotor and each have an annular continuous form.

8. A vehicle comprising the variable-field rotary electric machine according to claim 1.

* * * * *